United States Patent [19]

Rosser

[11] Patent Number: 4,613,173
[45] Date of Patent: Sep. 23, 1986

[54] KNOT TYING JIG

[76] Inventor: Robert Rosser, 7051 Old Mill Rd., Chesterland, Ohio 44026

[21] Appl. No.: 560,567

[22] Filed: Dec. 12, 1983

[51] Int. Cl.$^4$ ............................................. B65H 69/04
[52] U.S. Cl. ................................................... 289/17
[58] Field of Search .................... 289/17; D22/31; 248/444, 460; 108/43, 115, 132, 150; 297/440

[56] References Cited

U.S. PATENT DOCUMENTS

| D. 211,685 | 7/1968 | Hill | 289/17 X |
| D. 219,021 | 10/1970 | Graber | D22/31 |
| D. 247,713 | 4/1978 | Etes | D22/31 |
| 544,684 | 8/1895 | Parker | 248/444 X |
| 2,498,920 | 2/1950 | Holland | 289/17 |
| 2,640,747 | 6/1953 | Bodenhoff | 248/444 |
| 2,734,299 | 2/1956 | Masson | 289/17 |
| 2,843,961 | 7/1958 | Semple | 289/17 X |
| 3,321,225 | 5/1967 | Miller | 289/17 |
| 3,965,605 | 6/1976 | Allen | 289/17 |
| 4,129,332 | 12/1978 | Hoeholt | 297/440 |

*Primary Examiner*—Louis K. Rimrodt
*Attorney, Agent, or Firm*—Renner, Otto, Boisselle & Lyon

[57] ABSTRACT

A portable and compact knot tying jig which comprises a panel having a generally black or dark face which may have knot diagrams printed thereon. The panel has an offset extending horizontally along its approximate center and the legs of a U-shape bail extend upwardly through the offset. The end of one leg is provided with an alligator clip-type clamp adapted to hold a fishhook or the like while the end of the other leg is provided with a transverse slit adapted to receive and hold the free end of the line.

14 Claims, 4 Drawing Figures

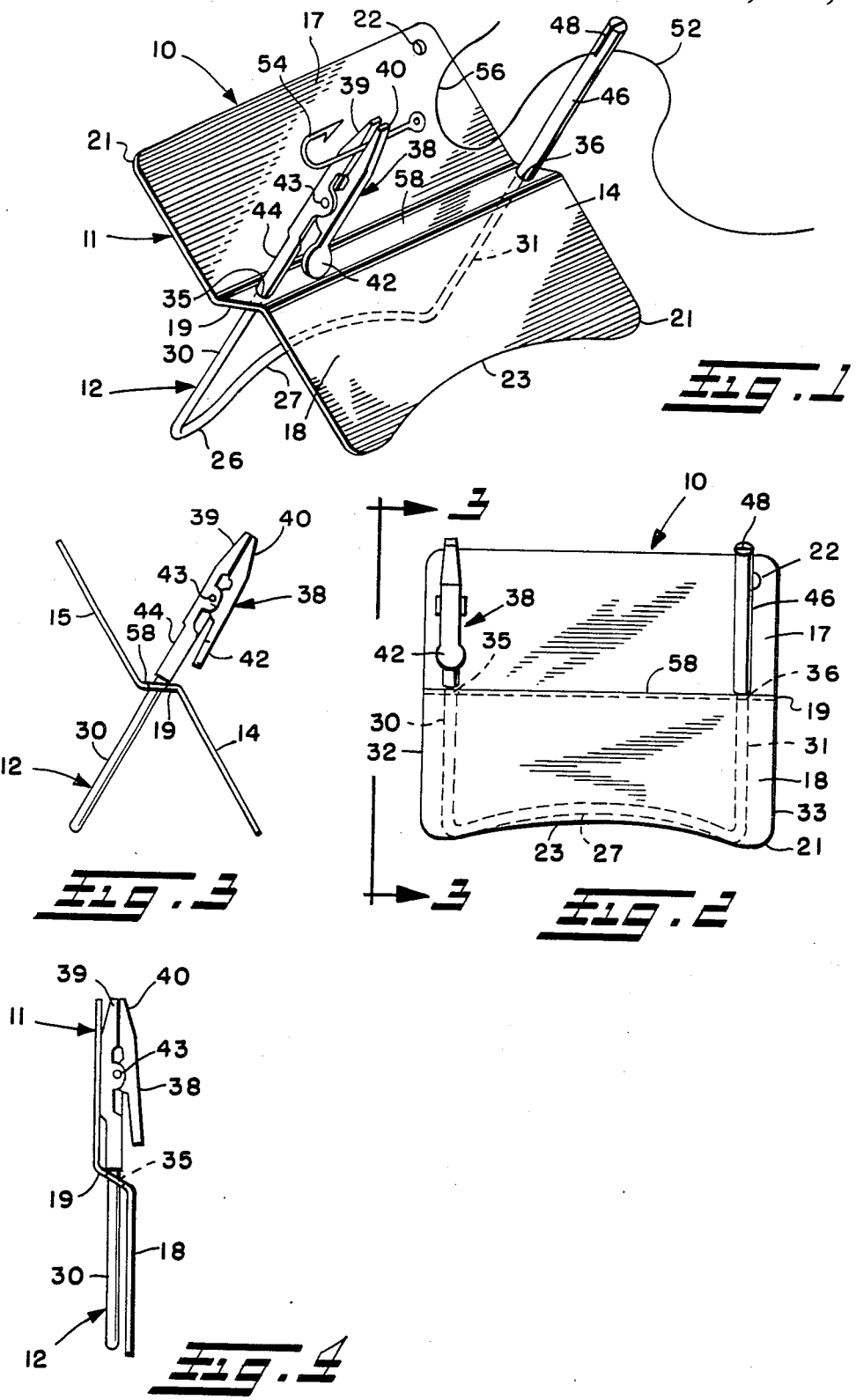

KNOT TYING JIG

This invention relates generally as indicated to a knot tying jig and more particularly to a small portable jig primarily useful for anglers and especially for anglers in the field.

BACKGROUND OF THE INVENTION

The advent of the monofilament plastic fishing line while advantageous in many respects has created knot typing problems for fishermen. The monofilament line is very fine and is a clear or semi-clear plastic. The line is difficult to see for many fishermen, particularly fishermen with eyesight problems such as those requiring bifocal or trifocal glasses. Thus, it can be quite frustrating to tie a knot in a monofilament line, particularly under conditions often times encountered while fishing. Moreover, the angular usually finds he or she doesn't have enough hands when trying to secure such a line with a complex knot to itself, or to a fishhook, lure or the like. While knot tying jigs have been provided, these are usually the type used on work bench and are generally not suitable, either for coping with monofilament line, or for field use. Accordingly, there is a need for a portable and compact knot typing jig which will enable an angler more easily to form knots in monofilament line in the field.

SUMMARY OF THE INVENTION

The jig of the present invention comprises a panel having a generally black or dark face which may have knot diagrams printed thereon. The panel has an offset extending horizontally along its approximate center and the legs of a U-shape bail extend upwardly through the offset. The ends of the legs provide stanchions on one of which is provided an alligator clip-type clamp adapted to hold a fishhook or the like, while the other is provided with a transverse slit adapted to receive and hold the free end of the line, thus freeing both hands for tying the knot against a dark background. The holes through which the bail legs fit are slightly oversize or elongated to permit the bail to pivot to and from the plane of the panel to form an X-shape stand-by-itself jig or to fold flat for convenient storage in a pocket or tackle box.

The panel includes a planar top plate and a parallel planar bottom plate with the offset being therebetween, the offset extending at an angle between the top and bottom plates to form a substantially horizontal shelf when the plate and bail form an X-shape stand. When forming such X-shape stand, the bail legs projecting through the offset project generally toward the user with the front of the panel providing the dark background for knot tying. Below the offset the bail is, of course, behind the panel and the bottom of the bail generally corresponds to the bottom of the panel, both having a concavity which allows the X-shape stand to saddle on the curve of a user's thigh or knee and provide also a four point stability on other more even surfaces.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawing:

FIG. 1 is an isometric view of a jig in accordance with the present invention;

FIG. 2 is a front elevation of such jig;

FIG. 3 is an end elevation seen from the line 3—3 of FIG. 2 showing the general by X-shape configuration of the jig when in operation; and FIG. 4 is an end elevation of the jig in its folded or storage condition.

DETAILED DESCRIPTION OF THE PREFERRED EMBODIMENT

Referring first to FIG. 1, there is illustrated generally at 10 a knot tying jig in accordance with the present invention. The jig comprises two basic elements, one being a panel 11 and the other a U-shape bail 12. The panel 11 includes a front 14 and a back 15, the front extending generally toward the viewer in FIGS. 1 and 2, or to the right in FIGS. 3 and 4. The panel includes a top planar plate portion 17 and a bottom planar plate portion 18 with an angularly disposed offset 19 therebetween. The offset may only slightly separate the upper and lower planes of the plate.

The corners of the panel are rounded as indicated at 21 and the upper right corner is provided with a hole seen at 22. The hole permits the attachment of a fingernail clipper by a suitable key chain or strand. Such clippers are conventionally used by anglers to cut lines and "dress" their knots. In any event, with the clipper attached to the panel of the jig in this manner, it will be convenient at all times.

It is also noted that the bottom edge of the panel has a rather large radius concavity indicated at 23 as does the bottom or bight portion 26 of the bail. This concavity of the bight portion of the bail is illustrated more clearly at 27 in FIGS. 1 and 2.

In addition to the bight portion, the bail 12 includes upstanding legs 30 and 31 which extend generally parallel to and fairly close to the edges 32 and 33, respectively of the lower plate 18 of the panel. In this manner, the bail corresponds generally to the bottom and side edges of the panel, and vice versa.

The legs 30 and 31 of the bail project upwardly through the offset 19 through holes 35 and 36. These holes may be slightly oversize or elongated to permit the bail to pivot with respect to the panel to a limited degree.

Above the offset each leg forms a stanchion which in operative position projects generally toward the user or toward the front of the panel.

On the leg 30 there is provided on the front of the panel an alligator type spring clamp seen at 38. Normal alligator clips are provided with serrated jaws and are adapted to make electrical contact with exposed wires. However, the alligator-type clamp of the present invention includes jaws 39 and 40 having planar gripping surfaces so as not bite into or mar line or elements gripped thereby. As is normal with alligator clips, they may be opened and closed by pressing or releasing the extension 42 of one jaw pivoting that jaw about the pivot 43, a coil spring about the pivot normally holds the clamp in closed position.

The other jaw of the clamp includes a cylindrical extension fitting over the leg of the bail indicated at 44 and the alligator clip may in this manner be secured to the leg of the bail by soldering, adhesives, or crimping.

The opposite leg of the bail 31 beyond the offset or on the forward side of the panel includes an extension 46 which may be of plastic or wood. The outer end of the extension is provided with a transverse slit indicated at 48. The slit may be approximately one-half inch deep and is adapted to receive a monofilament line 52 wedged therein. Also, as illustrated, the alligator-type clamp may receive a fishing hook 54 in the manner indicated, or an eyelet, a lure or some other accessory normally used by anglers to which monofilament lines must normally be knotted.

It should be noted that in the drawings, the appearance of the line 52 is not fairly illustrated. Only that portion of the line 52 seen at 56 behind the front face of the panel would normally be readily visible.

Referring now to FIGS. 3 and 4, it will be seen that the U-shape bail 12 at its lower end extends behind the panel 11 while the upper legs thereof project through the offset of the panel and extend forwardly or to the front of the panel when the jig is in the form of an X-shape and stand alone jig. This presents the two lines or line and the accessory in front of the normally dark or black face of the panel. In such X-shape condition, the offset 19 forms a substantially horizontal shelf 58 on which components of the knot tying procedure may be placed.

As indicated in FIG. 4, when the jig is not in use, it may be folded essentially flat with the bail and the panel essentially lying in the same plane. This permits the jig to be stored quite readily in a pocket or tackle box.

It will also be appreciated that the normally dark or black face of the panel or plate may be provided with knot diagrams conventionally used by anglers thus assisting the user in application of the present invention.

It can readily be seen that the knot tying jig of the present invention is extremely simple in construction and in operation and is useful both primarily in the field but also in home work bench applications.

What is claimed is:

1. A knot tying jig comprising a panel having an upper and lower edge and opposite sides, a pair of stanchions each having a portion extending upwardly above the panel and downwardly below the panel, one stanchion on each opposite side of the panel, the portion of the stanchions extending downwardly below the panel cooperating with the lower edge of the panel to support the same extending upwardly at an angle in front of the user, and means on the portions of the stanchions extending generally upwardly above the panel and toward the user to hold a fishing line or fishing accessories to enable the user to use both hands to tie a fishing knot against the background of the panel.

2. A jig as set forth in claim 1 wherein said panel includes an offset extending horizontally along the approximate center thereof.

3. A jig as set forth in claim 2 wherein said bail below said offset is behind said panel with the legs projecting through the offset to the front of said panel.

4. A jig as set forth in claim 3 wherein said bail corresponds generally to the bottom of said panel.

5. A jig as set forth in claim 4 wherein the lower edge of the bail and panel are concave to fit on a user's knee.

6. A jig as set forth in claim 2 wherein said legs project upwardly through said offset through slightly oversize holes whereby said bail may pivot to and from the general plane of the panel to form an X-shape stand or to fold flat for convenient storage.

7. A jig as set forth in claim 6 wherein said panel includes a planar top and a parallel planar bottom with said offset therebetween, said offset extending at an angle between the top and bottom to form a substantially horizontal shelf when said panel and bail form an X-shape stand.

8. A jig as set forth in claim 1 wherein said stanchions are the legs of a U-shape bail.

9. A jig as set forth in claim 1 wherein said means comprises an alligator type spring clip on the end of one stanchion and a transverse line receiving slit on the end of the other.

10. A knot tying jig comprising a panel, a pair of stanchions, each of the stanchions including holding means for holding a fishing line or fishing accessories, said stanchions being pivotally movable with respect to said panel to move between a folded flat position and in which the jig may be readily stored and an upwardly extended position in which the holding means positions a fishing line or fishing accessories above the plane of the panel to enable the user to use both hands to tie a knot against the visual background of the panel, each of the stanchions including means extending below the panel for supporting the panel.

11. The jig of claim 1 wherein the panel includes first and second generally parallel and planar portions connected by a transverse portion, and enlarged openings through the transverse portion of the panel to enable said stanchions to be folded flat or moved to the extended position with respect to the panel.

12. The jig of claim 11 including a U-shape bail, the stanchions forming opposite parallel legs of the bail, the stanchions extending through the openings in the transverse portion of the panel and having the holding means mounted on end portions thereof.

13. The jig of claim 11 wherein when the stanchions are in the folded-flat position, the part of each stanchion on one side of the transverse panel portion abuts one side of the first and second portions of the panel and the part of each stanchion on the other side of the transverse panel portion abuts the opposite side of the other of the first and second portions of the panel.

14. A jig as set forth in claim 10 wherein said stanchions are in the form of rods interconnected below the panel and when not folded flat supporting the panel at an angle to an underlying support surface.

* * * * *